United States Patent
Iozzo et al.

(10) Patent No.: US 11,604,688 B2
(45) Date of Patent: **\*Mar. 14, 2023**

(54) CONTAINER APPLICATION FOR ANDROID-BASED DEVICES

(71) Applicant: CrowdStrike, Inc., Irvine, CA (US)

(72) Inventors: Vincenzo Iozzo, London (GB); Giovanni Gola, London (GB)

(73) Assignee: CrowdStrike, Inc., Irvine, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 17/234,602

(22) Filed: Apr. 19, 2021

(65) Prior Publication Data
US 2021/0263790 A1 Aug. 26, 2021

Related U.S. Application Data

(63) Continuation of application No. 16/289,344, filed on Feb. 28, 2019, now Pat. No. 10,983,849.

(51) Int. Cl.
*G06F 9/54* (2006.01)
*G06F 8/65* (2018.01)

(52) U.S. Cl.
CPC ............... *G06F 9/547* (2013.01); *G06F 8/65* (2013.01)

(58) Field of Classification Search
None
See application file for complete search history.

(56) References Cited

U.S. PATENT DOCUMENTS

| 7,174,361 B1 | 2/2007 | Paas |
| 2004/0036719 A1 | 2/2004 | Van Treeck |
| 2008/0016504 A1 | 1/2008 | Cheng et al. |
| 2009/0203355 A1 | 8/2009 | Clark |
| 2009/0207050 A1 | 8/2009 | Arpin et al. |
| 2009/0270126 A1 | 10/2009 | Liu |
| 2011/0092185 A1 | 4/2011 | Garskof |
| 2014/0007222 A1 | 1/2014 | Qureshi et al. |
| 2014/0053150 A1 | 2/2014 | Barnett et al. |
| 2014/0148194 A1 | 5/2014 | Ahn et al. |

(Continued)

FOREIGN PATENT DOCUMENTS

| CN | 106897611 A | 6/2017 |
| WO | WO2013147993 A1 | 10/2013 |

OTHER PUBLICATIONS

The Extended European Search Report dated Jun. 2, 2020 for European Patent Application No. 20153382.5, 8 pages.

(Continued)

*Primary Examiner* — Craig C Dorais
(74) *Attorney, Agent, or Firm* — Lee & Hayes, P.C.

(57) ABSTRACT

A computer-processor executable container application operates within an operating system, such as an Android operating system. The application is itself configured to execute applications contained within the container application. The container application may create a secure computing environment in which business applications on a computing device can be protected and monitored without affecting or interacting with other applications or data on the computing device. Such a secure computing environment may enable businesses to protect their data residing on a personal computing device and to have visibility into how the data is accessed, used, and shared, while not interfering with personal use of the personal computing device.

20 Claims, 4 Drawing Sheets

(56) References Cited

U.S. PATENT DOCUMENTS

2020/0278895 A1   9/2020   Iozzo et al.

OTHER PUBLICATIONS

Non Final Office Action dated Sep. 17, 2020 for U.S. Appl. No. 16/289,344, "Container Application for Android-Based Devices," Iozzo, 8 pages.
Non Final Office Action dated Dec. 30, 2019 for U.S. Appl. No. 16/289,344 "Container Application for Android-Based Devices," Iozzo, 8 pages.
Final Office Action dated May 21, 2020 for U.S. Appl. No. 16/289,344 "Container Application for Androidbased Devices," Iozzo, 9 pages.

CONTAINER APPLICATION FOR ANDROID-BASED DEVICES

RELATED APPLICATION

This application is a continuation of and claims priority to U.S. patent application Ser. No. 16/289,344, filed Feb. 28, 2019, titled "CONTAINER APPLICATION FOR ANDROID-BASED DEVICES," the entirety of which is incorporated herein by reference.

BACKGROUND

With Internet use forming an ever-greater part of day to day life, it is now common for employees of a firm or company to use mobile devices for business purposes (e.g., email clients, messaging apps, and so on). Many of these devices may be personal devices, not owned by the firm or company, and so will likely contain a mixture of personal and company data, each of which could be sensitive in nature. Businesses want to protect their company data and have visibility into how the company data is accessed, used, and shared, without interfering with personal use of the device, and without the costs associated with purchasing and provisioning devices themselves. Similarly, employees want to protect and maintain privacy of their personal data and, independently of the firm or company, have control over how their personal data is accessed, used, and shared, without interfering with business use of the device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
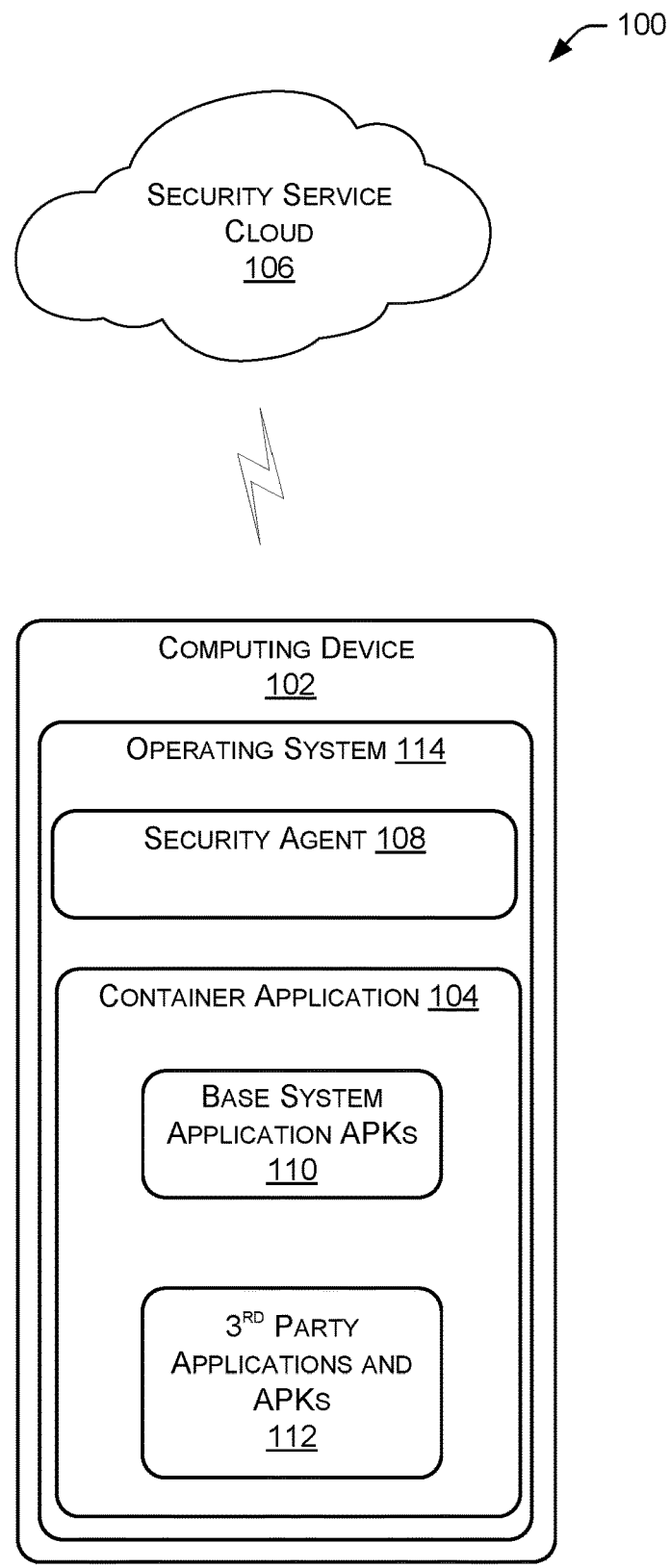
FIG. 1 illustrates an example computing environment including a computing device and container application.

This disclosure describes, in part, a computer-processor executable application that operates within an operating system, such as an Android operating system. Such an application, herein referred to as a container application, is itself configured to execute applications contained within the container application. Examples provided herein are all described with respect to an open source operating system, such as the Android operating system.

The container application, which may be installed on an Android-based computing device, may create a secure computing environment in which, for example, business applications on a computing device can be protected and monitored without affecting or interacting with other applications or data on the computing device. Such a secure computing environment may enable businesses to protect their data residing on a personal computing device and to have visibility into how the data is accessed, used, and shared, while not interfering with personal use of the personal computing device. In various implementations, described at a high level, the container application works by intercepting communications or interactions between business applications inside the container and the Android operating system. Roughly speaking, the operating system may run only the container application without an awareness that internally there are actually (one or more) business applications installed. In some embodiments, the Android operating system does not have access to source code of a contained application.

The container application may be installed and operated on an Android device (e.g., a computing device that functions via the Android operating system) as a "normal" application (e.g., an application based on an Android package kit (APK) file format, which is used by the Android operating system for distribution and installation of mobile applications) such that this application appears to the Android operating system as such. At its operating level, the container application has some similarities, and differences, to a relatively lightweight virtual machine. For example, a virtual machine emulates a computer processor, whereas the container application emulates functionalities of the operating system. Individual $3^{rd}$ party applications may use a subset of such functionalities (e.g., different subsets for different applications). In other words, the container application can emulate particular functionalities at the application level for native code (e.g., Assembly, C, and C++) and for Java/Kotlin code, for example). Also, the container application may be agnostic to the operating system and to code of a contained $3^{rd}$ party application.

Business applications or other type of applications, hereinafter generally referred to as $3^{rd}$ party applications, may be installed not onto the Android operating system, but instead installed to (be contained) inside the container application. Acting as a layer between the $3^{rd}$ party application and the Android operating system, the container application may provide visibility and control over the actions of the contained application. Meanwhile, the Android operating system may be unaware of the containerized $3^{rd}$ party application having been installed and is only aware of (e.g., "sees") the container application.

In various embodiments, $3^{rd}$ party applications residing inside the container application cannot interact directly with the Android operating system but may only interact directly with the container application. Thus, the container application may be enabled to handle whatever the contained $3^{rd}$ party applications require of the Android operating system such that the contained $3^{rd}$ party applications function properly and as expected. This ability of the container application may involve implementing virtual versions of parts of the Android operating system that expose particular parts of the application programming interface (API) of the Android operating system to the contained $3^{rd}$ party applications.

In various embodiments, the operation and presence of the container application on a computing device is essentially transparent to users of the computing device. For example, users of a personal computing device may continue to use the same applications to which they are accustomed, while business data and its associated applications are maintained as a separate entity. In some implementations, the container application may have permissions required by the contained $3^{rd}$ party applications and may allow for access to other expected components/applications (e.g., device camera, WebView provider, and so on) while emulating enough of the Android operating system.

In some embodiments, the container application may intercept every call that the contained $3^{rd}$ party applications make to the Android API of the device. In some examples, a $3^{rd}$ party application may act as a virtualized application that appears to a user of the device to interface directly with the Android operating system of the device. However, such a virtualized application may interface with an application virtualization layer that intercepts or "hooks" communications between the contained 3rd parry application and the Android operating system and acts as a proxy between the 3rd parry application and native system registries and system files of the Android operating system running on the device. Much of the Android API may be implemented via binder interfaces, and the hooking may involve replacing binder handles with a container application implementation of each binder interface. In various examples, upon intercepting (or hooking) an API call, the container application may either handle the API call internally, modify the API call and then pass it on to the Android operating system, or pass the API call on to the Android operating system unchanged.

As described above, the container application provides a secure environment in which to run a ($3^{rd}$ parry) application. The container application may also provide visibility into the application and a pathway for information to be sent to a cloud-computing infrastructure. In some implementations, such information may regard calls (e.g., clipboard events) made by the contained $3^{rd}$ party application. Such information may also be about the device as a whole (e.g., battery level). In some implementations, the container application may access information from various sensors of the device, such as GPS or WiFi, and send such information to the cloud.

Environment—Operations

FIG. 1 illustrates an example computing environment 100 including a computing device 102 and a container application 104. Computing device may be configured to function with an open source operating system, such as the Android operating system. Computing device 102 may include a processor (e.g., a central processing unit (CPU) and/or a graphics processing unit (GPU)), memory for storing the Android operating system, a registry, a plug-and-play (PnP) manager, device stacks, and I/O devices that allow for communications with cloud computing, such as security service cloud 106, which in some implementations may provide computing for computer security services, for example.

Computing device 102 may be any sort of computing device equipped with one or more external bus ports and/or one or more internal ports found on internal hubs. For example, computing device 102 may be a work station, a personal computer (PC), a laptop computer, a tablet computer, a personal digital assistant (PDA), a cellular phone, a media center, an embedded system, a server or server farm, multiple and/or distributed server farms, a mainframe, or any other sort of device or devices.

In some implementations, computing device 102 and security service cloud 106 may be connected by any sort of network or networks, such as wide area networks (WANs), local area networks (LANs), the Internet, or any combination of such networks.

In various examples, security service cloud 106 implements a remote security service that interfaces with a security agent 108 in computing device 102 and other computing devices. Service cloud 106 may aggregate and analyze information received from computing device 102 and other computing devices (such as system inventories, bus device fingerprints, traffic information, user-login identifications, etc.) and may take actions, such as updating configurations of security agent 108 or sending commands to the computing devices to take some action (e.g., alter, limit, or otherwise block functionality of a device or process).

Container application 104 may include base system application APKs 110 and any number of $3^{rd}$ party applications and associated $3^{rd}$ party application APKs 112. APKs 110 may be used to emulate certain functionalities of the Operating Systems (e.g., such as a camera, global system for mobile communications (GSM) library, and so on). APKs 112 are all the applications that the container virtualizes.

Container application 104 is included in, and executed by, an operating system 114, which may be the Android operating system. Operating system 114 also includes security agent 108, which may be a kernel-level security agent to monitor and record activity on computing device 102. Security agent 108 may analyze the activity, generate alerts and events, and provide those alerts and events to security service cloud 106. Security agent 108 may be installed, and be configurable, by security service cloud 106, receiving, and applying while live, configurations of security agent 108 and its component(s), such as a driver, for instance. An example security agent is described in greater detail in U.S. patent application Ser. No. 13/492,672, entitled "Kernel-Level Security Agent" and filed on Jun. 8, 2012, which issued as U.S. Pat. No. 9,043,903 on May 26, 2015.

Container application 104, may include an activity that is launched when a user of computing device 102 starts the container application on the computing device. The activity may handle enrollment of the computing device with security service cloud 106, container application configurations, container application installation, and permission requests, just to name a few examples. Upon or after such tasks are complete, launching container application 104 may in turn initiate the container application to execute a contained $3^{rd}$ party application.

In some implementations, container application 104 may include a library used to implement the actual containerization of $3^{rd}$ party applications, including virtual system components and API hooks, for example.

Computing devices may support both 32-bit and 64-bit modes and container application 104 may support Android application binary interfaces (ABIs). There are, however, many applications that rely on 32-bit-only Java native interface (JNI) libraries. In such a case, container application 104 must run in 32-bit mode. The Android operating system may pre-assign an ABI for each application, which effectively means container application 104 will be launched in 64-bit mode. An ABI Wrapper is an auxiliary application that works around this situation. The ABI Wrapper may be compiled with a dummy JNI library that forces the ABI Wrapper to be loaded as a 32-bit process. When container application 104 needs to launch a 32-bit application, the container application may launch a new ABI Wrapper process instead. The new (32-bit) process may load container application 104 into its own process and launch it in 32-bit mode. Container application 104 then loads the containerized 3rd party application, which can now be run as a 32-bit application.

In various implementations, system memory of computing device 102 may be system memory and is volatile (such as RAM), non-volatile (such as ROM, flash memory, etc.) or some combination of the two. Computing device 102 may also include additional data storage devices (removable and/or non-removable) such as, for example, magnetic disks, optical disks, or tape. Non-transitory computer-readable media may include volatile and nonvolatile, removable and non-removable tangible, physical media implemented in technology for storage of information, such as computer readable instructions, data structures, program modules, or other data. System memory and other memories are examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by computing device 102. Any such non-transitory computer-readable media may be part of computing device 102.

In further implementations, computing device 102 may also have input and output device(s), such as a keyboard, a mouse, a touch-sensitive display, a voice input device, a display, speakers, a printer, etc. These devices are well known in the art and need not be discussed at length here. Computing device 102 also contains communication connections that allow computing device 102 to communicate with other computing devices, such as device(s) of security service cloud 106.

In various implementations, the Android operating system may be any sort of software that supports a container application and basic functions of computing device 102, such as scheduling tasks, executing applications, and controlling peripherals (such as bus devices).

Figure 2:
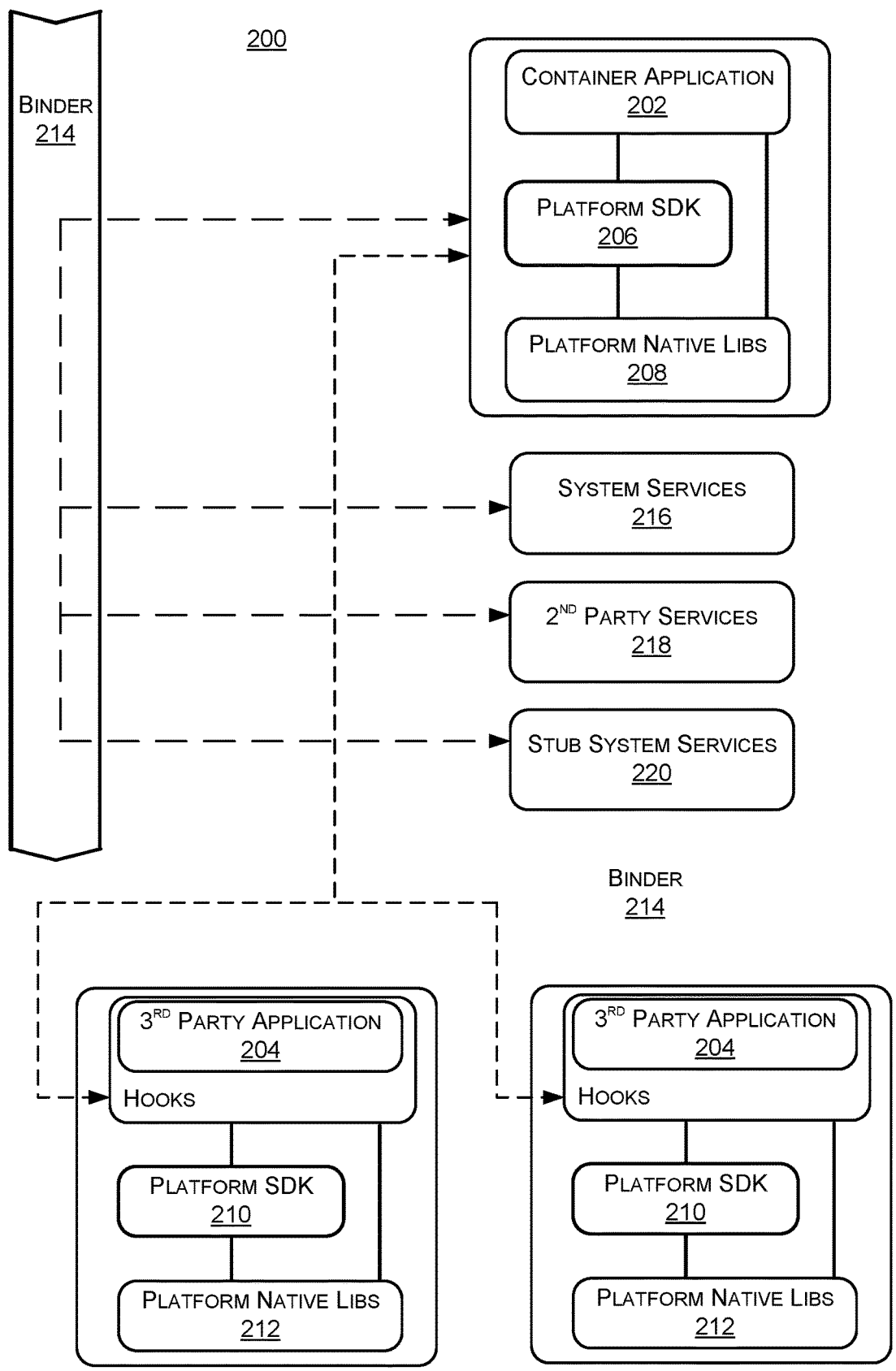
FIG. 2 is a schematic diagram that illustrates an example structure including a container application and $3^{rd}$ party applications.

FIG. 2 is a schematic diagram that illustrates an example structure 200 of an Android-based computing device including a container application 202 and 3rd party applications 204. Container application 202 is associated with a platform software development kit (SDK) 206 and platform native libraries 208. 3rd party applications 204 are each associated with a respective platform SDK 210 and platform native libraries 212. A binder 214 is used by the Android operating system for a number of things. For example, an activity (e.g., an application/process) manager may use binder 214 for launching and managing components in a computing process.

Structure 200 also includes system services 216, 2nd party services 218, and stub system services 220. These services may communicate, via binder 214, with container application 202. All the communication between the operating system, binder 214, 2nd party services 218, and stub system services 220 may communicate with 3rd party applications and occur via container application 202 by hooking calls to/from the 3rd party applications.

Though much of the Android API uses binder interfaces, in some embodiments standard operations on files, sockets, etc. may occur through standard Linux system calls. While the Android operating system calls are not hooked directly, the calls generally go through a library's standard functions (e.g., open, close, send, recv, socket, and so on), and therefore the container application intercepts the calls instead of the Android operating system.

A hooking process may include: finding the pointer to the original function, so that it can be called internally; analyzing symbol tables of every shared library loaded in the current process; and replacing pointers to the original function with pointers to functions defined in the container application. Such a process may provide additional control and visibility for applications inside the container, at a lower level, for example.

FIGS. 3-6 illustrate example processes 300, 400, 500, and 600. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 3:
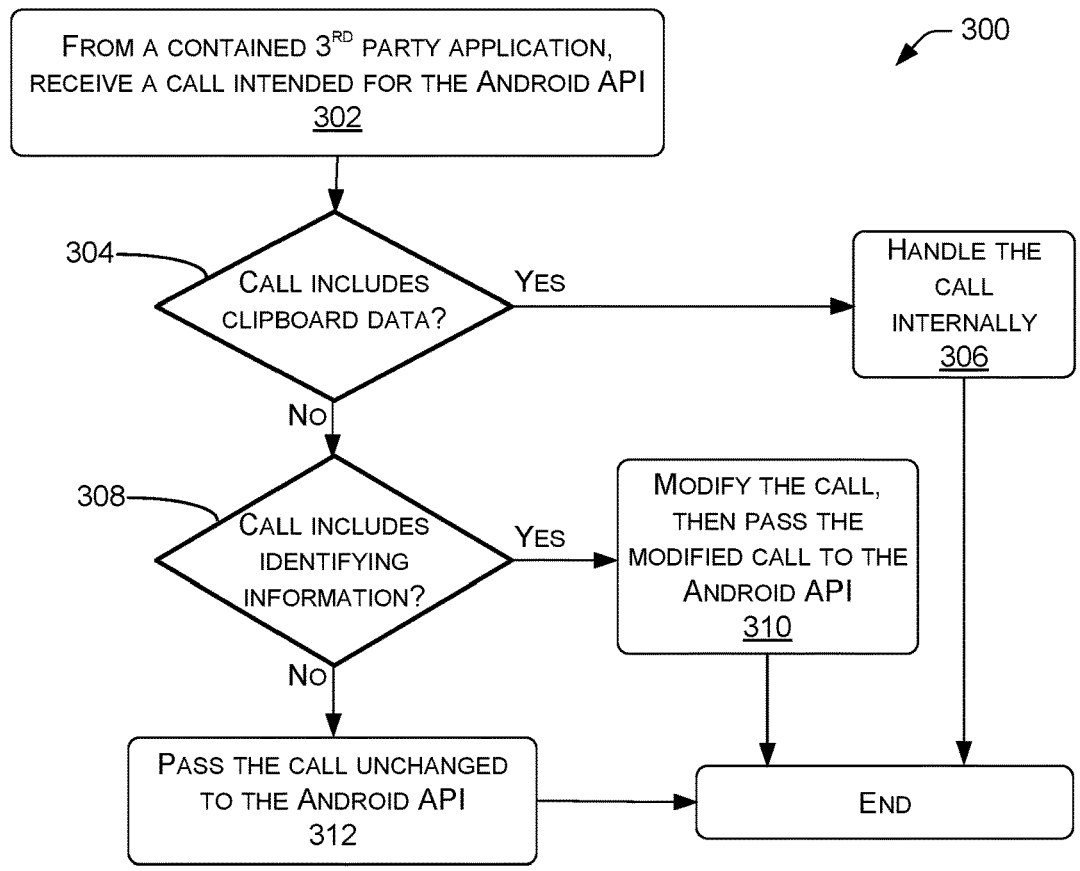
FIG. 3 illustrates an example process for hooking calls from a 3rd party application within a container application.

FIG. 3 illustrates an example process 300 for hooking calls from a 3rd party application within a container application. As described above, container application 302, for example, intercepts (e.g., hook) every call that contained 3rd party applications 304 make to the Android API. Much of the Android API is implemented via binder interfaces of binder 314, and hooking involves replacing binder handles with an implementation of container application 302 for each binder interface, for example.

Process 300, performed by container application 202, begins at 302, when the container application receives (e.g., intercepts or hooks) an API call generated by a contained 3rd party application. At 304, the container application determines if the API call includes data, such as clipboard data. If so, then process 300 proceeds to 306 where the container application handles the API call internally. Such internal handling may be used, for example, to protect data. For instance, the container application may implement a virtual clipboard, separate from the system clipboard. When a user copies data inside a contained 3rd party application, the data is intercepted by the virtual clipboard and stored there, thus never reaching the system clipboard. Such a process prevents data from being copied to applications outside the container application but allows data to be copied among containerized applications. Such internal handling may involve some interaction with the Android operating system.

If the container application determines that the API call does not include data, then process 300 proceeds to 308 where the container application determines if the API call includes identifying information. If so, then process 300 proceeds to 310 where the container application modifies the API call and subsequently passes the modified API call to the Android API. The process at 310 may be used to ensure the applications work smoothly inside the container application. This may be somewhat challenging because the only application that is actually installed on the Android operating system is the container application, and the containerized applications are not visible to the Android operating system. When an application is installed onto the Android operating system, the application is assigned various identifiers, such as a user ID. Also, each application has a package name that identifies it. These are parameters in many API calls, and are used by the Android operating system for security, to check that application only have access to the resources they are allowed, and cannot access resources belonging to other applications, for example. When a containerized application makes an API call that includes the package name, this API call is intercepted by the container application, which then makes this API call to the Android operating system on behalf of the containerized application. The Android operating system may then see a package having a particular name that identifies the container application making the API call for another package. This would cause a security exception, and the container application may crash. For example, any API call that includes identifying information (package name, user ID, process ID, etc.) that is checked by the Android operating system will cause such a crash. To prevent this, any API call that includes such information may be modified by the container application before being passed on to the Android operating system, so that identifying information in the call matches the information belonging to the container application.

If the container application determines that the API call does not include identifying information, then process 300 proceeds to 312 where the container application passes the API call on to the Android operating system unchanged. In this case, there is no reason to interfere with the API call. There is no need to modify the API call from a security standpoint, and the API call would not leak information to the Android operating system.

In addition to intercepting API calls, the container application may also create internal representations of some classes used by the Android operating system. This may be necessary if the class includes a package name as a field, as this would need to be modified as it moves in or out of the container.

Figure 4:
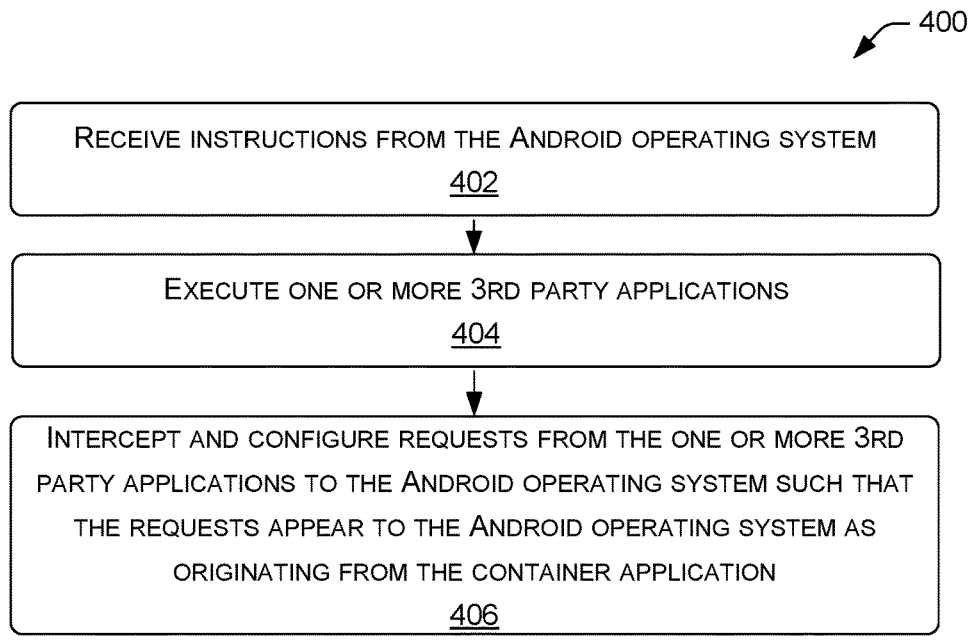
FIG. 4 illustrates an example process for executing 3rd party applications within a container application operating in an Android operating system.

FIG. 4 illustrates an example process 400 for executing 3rd party applications within a container application (e.g., 202) operating in an Android operating system. At 402, the container application may receive instructions from the Android operating system. At 404, the container application may execute one or more 3rd party applications. In some implementations, the Android operating system may include a virtual machine layer, such as a Java layer for example, in which the container application is configured to execute the one or more 3rd party applications. At 406, the container application may intercept and configure requests from the one or more 3rd party applications to the Android operating system such that the requests appear to the Android operating system as originating from the container application.

Figure 5:
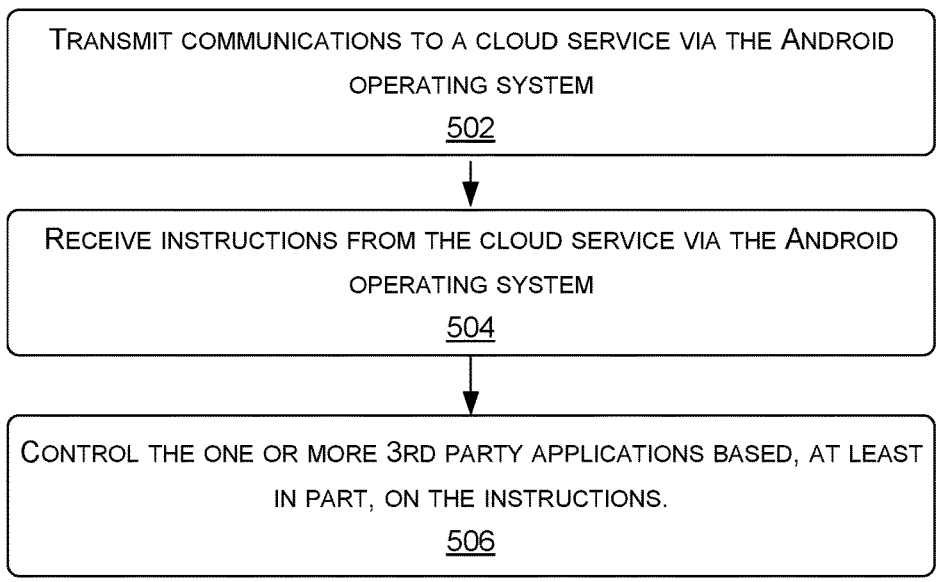
FIG. 5 illustrates an example process for communicating with a cloud service and controlling 3rd party applications within a container application operating in an Android operating system.

FIG. 5 illustrates an example process 500 for communicating with a cloud service and controlling 3rd party applications within a container application operating in an Android operating system. At 502, the container application may transmit communications to a cloud service via the Android operating system. At 504, the container application may receive instructions from the cloud service via the Android operating system. At 506, the container application may control the one or more 3rd party applications based, at least in part, on the instructions. In some implementations, the container application is able to receive a configuration update from the cloud service and transmit the configuration update to the one or more 3rd party applications.

Figure 6:
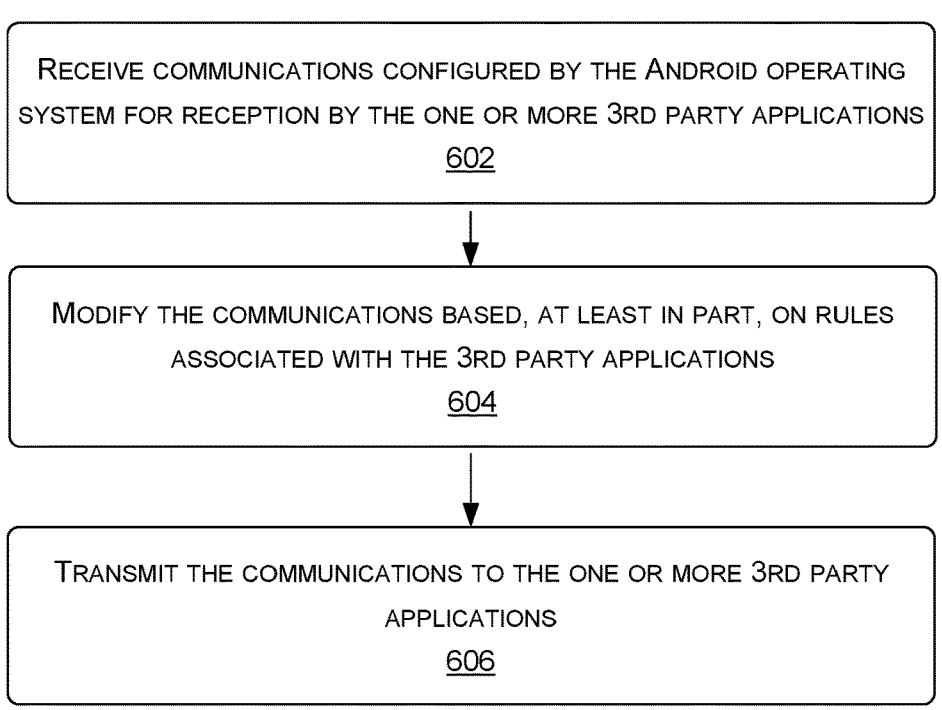
FIG. 6 illustrates an example process for modifying communications between a container application and an Android operating system.

FIG. 6 illustrates an example process 600 for modifying communications between a container application and an Android operating system. At 602, the container application may receive communications configured by the Android operating system for reception by one or more 3rd party applications. At 604, the container application may modify the communications based, at least in part, on rules associated with the 3rd party applications. At 606, the container application may transmit the communications to the one or more 3rd party applications. In some implementations, the container application may be configured to provide at least a portion of an API of the Android operating system to the one or more 3rd party applications. In some implementations, the container application may be configured to provide information to a cloud service via the Android operating system regarding operations or calls generated by the 3rd party applications.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a processor;
an operating system processed by the processor; and
a container application executable by the operating system, the container application being a non-virtualized application and being able to receive a configuration update from a cloud service and transmit the configuration update to one or more 3rd party applications, wherein the container application is configured to act as a proxy between the one or more 3rd party applications and both native system registries of the operating system and system files of the operating system.

2. The system of claim 1, wherein the container application is configured to act as the proxy by:
executing the one or more 3rd party applications installed in the container application;
intercepting requests from the one or more 3rd party applications to the operating system; and
configuring the requests such that the requests appear to the operating system as originating from the container application.

3. The system of claim 2, wherein configuring the requests includes one of:
handling the requests internally within the container application,
modifying the requests and passing the modified requests to the operating system, or
passing the requests to the operating system without modification.

4. The system of claim 1, wherein the non-virtualized application is based on an Android package kit format.

5. The system of claim 1, wherein the container application emulates a component of the operating system and is configured to execute the one or more 3rd party applications.

6. The system of claim 1, wherein the container application is configured to:
transmit communications to the cloud service via the operating system;
receive instructions from the cloud service via the operating system; and
control the one or more $3^{rd}$ party applications based, at least in part, on the instructions.

7. The system of claim 1, wherein the container application is configured to:
- receive communications configured by the operating system for reception by the one or more 3rd party applications;
- modify the communications based, at least in part, on rules associated with the one or more 3rd party applications; and
- transmit the communications to the one or more 3rd party applications.

8. The system of claim 1, wherein the container application is configured to provide at least a portion of an API of the operating system to the one or more 3rd party applications.

9. The system of claim 1, wherein the container application is configured to provide information to the cloud service via the operating system regarding operations or calls generated by the one or more 3rd party applications.

10. A method comprising:
- operating a container application, the container application being a non-virtualized application and being able to receive a configuration update from a cloud service and transmit the configuration update to one or more 3rd party applications, in an operating system so that the container application acts as a proxy between the one or more 3rd party applications and both native system registries of the operating system and system files of the operating system.

11. The method of claim 10, wherein container application acts as the proxy by:
- receiving instructions from the operating system;
- executing the one or more $3^{rd}$ party applications installed in the container application;
- intercepting requests from the one or more $3^{rd}$ party applications to the operating system; and
- configuring the requests such that the requests appear to the operating system as originating from the container application.

12. The method of claim 11, wherein configuring the requests includes configuring the requests by one of:
- handling the requests internally within the container application,
- modifying the requests and passing the modified requests to the operating system, or
- passing the requests to the operating system without modification.

13. The method of claim 10, wherein the container application emulates a component of the operating system and is configured to execute the one or more 3rd party applications.

14. The method of claim 10, further operating the container application in the operating system so that the container application:
- transmits communications to the cloud service via the operating system;
- receives instructions from the cloud service via the operating system; and
- controls the one or more 3rd party applications based, at least in part, on the instructions.

15. The method of claim 10 further operating the container application in the operating system so that the container application:
- receives communications configured by the operating system for reception by the one or more 3rd party applications;
- modifies the communications based, at least in part, on rules associated with the 3rd party applications; and
- transmits the communications to the one or more 3rd party applications.

16. The method of claim 10, wherein the container application is configured to provide at least a portion of an API of the operating system to the one or more 3rd party applications.

17. The method of claim 8, wherein the container application is configured to provide information to the cloud service via the operating system regarding operations or calls generated by the 3rd party applications.

18. A non-transitory computer-readable medium having instructions stored thereon which, when executed by a computing device, cause the computing device to implement a container application to perform operations comprising:
- operating the container application to act as a proxy between one or more 3rd party applications and both native system registries of an operating system and system files of the operating system, the container application being a non-virtualized application and being able to receive a configuration update from a cloud service and transmit the configuration update to the one or more 3rd party applications.

19. The non-transitory computer-readable medium of claim 18, wherein operating the container application to act as the proxy includes:
- receiving instructions from the operating system;
- executing the one or more 3rd party applications installed in the container application;
- intercepting requests from the one or more 3rd party applications to the operating system; and
- configuring the requests such that the requests appear to the operating system as originating from the container application.

20. The non-transitory computer-readable medium of claim 19, wherein configuring the requests includes one of:
- handling the requests internally within the container application,
- modifying the requests and passing the modified requests to the operating system, or
- passing the requests to the operating system without modification.

* * * * *